United States Patent [19]

Shibata et al.

[11] Patent Number: 5,671,289

[45] Date of Patent: Sep. 23, 1997

[54] METHOD OF SETTING BELT AREAS IN AN IMAGE TO LOCATE BANDS OF BIOPOLYMERS

[75] Inventors: Hiromi Shibata; Akira Ito, both of Kanagawa, Japan

[73] Assignee: Fuji Photo Film Co., Ltd., Kanagawa, Japan

[21] Appl. No.: 452,681

[22] Filed: May 30, 1995

[30] Foreign Application Priority Data

May 27, 1994 [JP] Japan .................................. 6-138066

[51] Int. Cl.$^6$ ........................................................ G06K 9/00
[52] U.S. Cl. ............................................................. 382/129
[58] Field of Search ...................................... 382/129, 168, 382/170; 364/496, 497, 413.01, 413.13; 935/77, 86, 87; 435/6, 288.7

[56] References Cited

U.S. PATENT DOCUMENTS

| | | | |
|---|---|---|---|
| 4,837,687 | 6/1989 | Tanaka et al. | 364/413.01 |
| 4,841,443 | 6/1989 | Kakumoto et al. | 364/413.01 |
| 4,958,281 | 9/1990 | Hara | 364/413.01 |

FOREIGN PATENT DOCUMENTS 62-102375   5/1987   Japan ..................................... 382/129

*Primary Examiner*—Andrew Johns
*Attorney, Agent, or Firm*—Sughrue, Mion, Zinn, Macpeak, and Seas

[57] ABSTRACT

A method for determining the location and density of bands of biopolymers which are formed by developing and resolving a mixture of biopolymers on a supporting medium in one direction to form a lane of plural bands. The method includes the steps of inputting an image of the lane to a computer in the form of digital data comprising information of location and density, displaying the image, and setting a belt area along the lane which encompasses the aimed bands of the biopolymer. The belt area is then scanned a plurality of times in parallel directions crossing the lane with sufficiently small spacing so as to scan every band present within the belt area, in order to detect relationships of location and density on the digital data in the direction of the lane within the belt area. One dimensional data is then prepared to enable a determination of the location and density of the aimed bands.

6 Claims, 2 Drawing Sheets

METHOD OF SETTING BELT AREAS IN AN IMAGE TO LOCATE BANDS OF BIOPOLYMERS

FIELD OF THE INVENTION

The present invention relates to a sampling method of data of developed and resolved biopolymers. In more detail, the invention relates to a method for determining location and density of each of bands of biopolymers such as DNA, RNA, proteins and their fragments and modified polymers which are formed by developing and resolving a mixture of biopolymers on a supporting medium in one direction by gel electrophoresis, thin layer chromatography, or the like to form a lane of plural bands.

BACKGROUND OF THE INVENTION

In the studies of recently developed genetic engineering technology to reveal functions of living body or mechanisms of its duplication, it is prerequisite to learn genetic information of the living body under study. Accordingly, studies on DNA and RNA having specifically assigned genetic information (or their fragments or modified products) have been actively performed.

As a representative method for specifically detecting or isolating the desired genes, the Southern blotting method utilizing the characteristic construction of DNA and RNA in that a pair of polynucleotide chains which are complementary to each other is known. The Southern blotting method comprises the steps of cleaving DNA (or RNA) using a restriction endonuclease to give a mixture of DNA fragments, subjecting the mixture to gel electrophoresis using an agarose gel membrane to develop and resolve the mixture on the gel membrane, transferring the developed mixture onto a nitrocellulose filter, forming a hybrid using a pre-prepared prove (i.e., radioisotope-labelled DNA corresponding to the gene to be detected), removing a portion of the prove not involved in the formation of hybrid (i.e., hybridization) from the nitrocellulose filter, and subjecting the nitrocellulose filter having the hybrid thereon to autoradiography to give an image in which areas of the formed hybrid (i.e., the areas in which DNA fragments having a nucleotide sequence which corresponds to the desired gene are present) only blacken. In this way, the desired gene can be specifically resolved and detected. Also known are the Northern blotting method, which is mainly directed to analysis of RNA and the Western blotting method, which is mainly directed to analysis of proteins.

Generally, the desired hybrid present in the detected band is recovered from the supporting medium such as agarose gel membrane according to the locational information obtained by the blotting method. The recovered hybrid is purified and then utilized for various purposes. Therefore, it is very important to know the location and density of the hybrid on the supporting medium. Since the band containing the hybrid cannot be visually observed on the supporting medium, autoradiography is employed. In more detail, the location and density of the hybrid-containing band is checked using a autoradiographic image (i.e., autoradiogram) with a blackened area, and the supporting medium in the located area is removed and subjected to measurement of the desired hybrid using a liquid scintillation counter or other measuring apparatus. It is apparent that the procedure for checking the location of the desired band is apt to cause errors if the procedure is performed merely utilizing the skill of an operator. Particularly, in the case that the developed lane curves on the supporting medium due to unevenness of the medium or variation of the development conditions, it becomes more difficult to accurately ascertain the location of the desired band.

The conventional autoradiography has been conducted using a radiographic film. Recently, new autoradiography using a radiation image storage panel (also called "stimulable phosphor sheet") which contains a stimulable phosphor has been developed. According to the new autoradiography, a supporting medium having thereon a developed and resolved biopolymers (labelled with radioisotope) or a cellulose filter having the radioisotope-labelled biopolymers thereon is placed in contact with the radiation image storage panel to cause the storage panel to absorb a radiation energy emitted by the radioisotope of the labelled biopolymers. The radiation image storage panel is then irradiated with a stimulating light to emit a stimulated emission. The stimulated emission is collected by a detector and converted into a set of digital data in a photoelectric converter. The new autoradiography is advantageous in that an image data of location and density of the developed and resolved radioisotope-labelled biopolymer can be obtained directly in the form of digital data.

SUMMARY OF THE INVENTION

Accordingly, it is an object of the present invention to provide an improved method for sampling data of developed and resolved biopolymers.

Particularly, the invention has an object to provide an improved method for determining location and density of bands of biopolymers such as DNA, RNA, proteins and their fragments and modified polymers which are formed by developing a mixture of biopolymers on a supporting medium in one direction by gel electrophoresis, thin layer chromatography, or the like to form a lane of plural bands.

The present invention resides in a method for determining location and density of bands of biopolymers which are formed by developing and resolving a mixture of biopolymers on a supporting medium in one direction to form a lane of plural bands which comprises the steps of:

inputting an image of the lane in a computer in the form of digital data comprising information of location and density;

displaying the image in a display of the computer from the digital data;

setting a belt area along the lane which encompasses the aimed bands of biopolymer;

scanning the belt area plural times in directions crossing the lane with sufficiently small spacing so as to scan every band present within the belt area, said scanning being performed on the digital data and said directions being in parallel with each other, to detect relationships of location and density on the digital data in the direction of the lane within the belt area;

preparing one dimensional data showing location and density of a series of the bands in the direction of lane; and determining location and density of the aimed bands from the one dimensional data.

PREFERRED EMBODIMENTS OF THE INVENTION

In the above method of the invention, it is preferred to utilize the belt area in the form of a parallelogram such as a rectangle. Also preferred is that the scanning is performed in the direction perpendicular to the direction of the belt area. Also preferred is that the belt area is prepared in the form of a series of parallelograms in the case that the lane is not straight.

The belt area is preferably prepared by connecting a series of the bands at their centers to form a line and then widening the line on both sides thereof. In the case that the lane is not straight, the belt area is preferably prepared by connecting in sequence a series of the bands at their centers to form a polygonal line and then widening the line on both sides thereof.

DETAILED DESCRIPTION OF THE INVENTION

Figure 1:
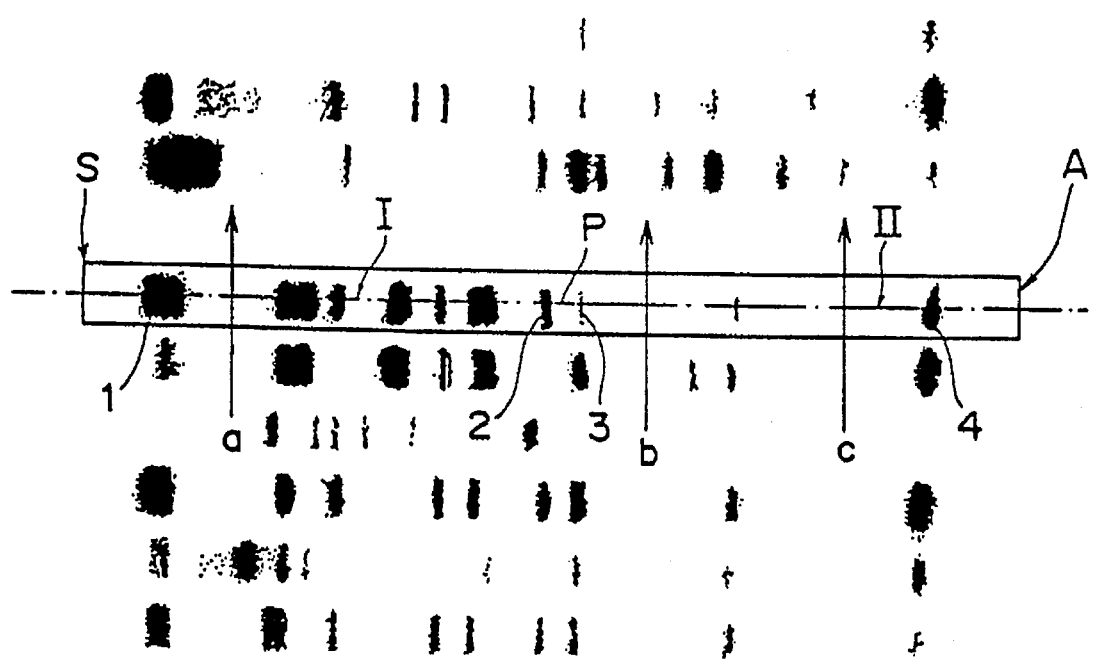
FIG. 1 shows an example of an autoradiograph of an electrophoretic pattern expressed in the form of a variable density type image on a display and further shows a procedure of the sampling according to the invention.

The sampling method of the invention, that is, the method for determining location and density of bands of developed and resolved biopolymers is generally performed by first converting image data of the biopolymers which have been developed and resolved electrophoretically on a supporting medium into a set of digital signals (i.e., digital data) and reproducing a visible image on a display attached to a computer. For instance, the developed and resolved image visualized on a radiographic film by means of autoradiography is optically read to convert the optically read image into digital data which are then processed on a display of a computer.

As is described hereinbefore, a new method of autoradiography utilizing a radiation image storage panel in place of a radiographic film of the conventional autoradiography has been already reported. The new autoradiography has been developed based on the radiation image recording and reproducing method utilizing the radiation image storage panel. The radiation image recording and reproducing method comprises the steps of causing the radiation image storage panel to absorb and record therein a radiation energy emitted by an object to be studied (i.e., exposing stage); and releasing the recorded radiation energy from the panel by irradiating the panel with a stimulating light such as an electromagnetic wave in the visible to infrared region. The radiation image recording and reproducing method can shorten the period of the exposing stage and can obviate production of troublesome chemical fog. Moreover, the autoradiograph of the isotope-labelled substance can be expressed directly in the form of digital data because the radiation energy of the radiation image is once recorded on the radiation image storage panel and then the stimulated emission is photoelectrically read. Accordingly, the sampling method of the invention can be most advantageously employed in combination with the radiation image recording and reproducing method utilizing the radiation image storage panel.

The sampling method of the invention is further described below by referring to a developed and resolved image which has been obtained by electrophoresis according to the Southern blotting method.

By the known method, DNA is cleaved by means of restriction enzyme such as endonuclease to give a mixture of DNA fragments. The mixture is then developed and resolved on a supporting medium in one direction to form a lane comprising a plurality of bands. Then, the bands of the lane are transferred onto a nitrocellulose filter. To the filter is applied a prove labelled with radioisotope so as to undergo hybridization. The prove which does not form a hybrid is removed. The filter is then subjected to autoradiography utilizing a radiation image storage panel to obtain image data in the form of digital data concerning location of the radioisotope-labelled prove on the filter and density of the located prove. The digital data are then inputted into a computer and processed to reproduce a visual image on a display to assist the sampling.

An example of an autoradiograph of an electrophoretic pattern expressed in the form of a variable density type image on a display is illustrated in FIG. 1. The lane enclosed with a rectangle is not straight but rather is slightly curved. According to the invention, a number of bands (i.e., electrophoretically resolved bands) in the curved lane can be identified in their location and density by the following steps.

Step (1)

From a line from which the electrophoresis starts or a line near to the starting line, a straight line I passing a center of standard band 1 and a center of standard band 2 is drawn. The standard bands 1, 2 are determined from the viewpoints of size, figure, and location of the band. In FIG. 1, the straight line I is expressed in the form of a dash and dotted line. Subsequently, a straight line II passing a center of standard band 3 and a center of standard band 4 is drawn. The standard bands 3, 4 are determined in the same manner. The straight line II is also expressed in the form of a dash and dotted line in FIG. 1. Thus, a polygonal line bent at point P at which the lines I and II intersect with each other is formed. The polygonal line is then widened to both sides to form a belt area A having a width approximately corresponding to the width of the standard bands.

In the above described embodiment, the belt area A is formed by first connecting the centers of the standard bands. The belt area A otherwise can be formed by drawing two lines, one of which is a line connecting each one end of the standard bands, and another is a line connecting each of other ends of the standard bands.

The bands formed by electrophoresis vary in their figures and sizes depending on the conditions of electrophoresis and amounts and characteristics of the substances to be developed. Therefore, the width of the belt area may be optionally determined taking these conditions into consideration. For instance, the belt area may be widened to slightly exceed the width of standard band or may be narrow as compared with the width of the standard band. Also, the belt area can be shifted in its location.

Otherwise, the belt area can be formed simply to enclose the bands with the frame of the belt in the form of a single parallelogram or a series of plural parallelograms (in the case that the lane is curved).

Step (II)

The belt area A obtained by Step (II) is scanned plural times in directions crossing the lane with sufficiently small spacing so as to scan every band present within the belt area. The direction of each scanning is set in parallel with each other. This means that the directions a, b, c in FIG. 1 are set to be in parallel with each other. The scanning is performed on the digital data representing the image of belt area, and the scanning is made by detecting the digital signals of the belt area in the determined direction and sequentially processing the detected signals (i.e., generally by scanning the detected digital data). The detection and the additional operations can be readily performed using a computer system. The direction of detection to cross the belt area is generally set to correspond to a direction perpendicular to the belt. Even if the belt area bends at the point P, the direction set to become perpendicular to the belt beginning from the starting line S is maintained not only before the point P, but also after the point P. In other words, a once determined scanning direction is maintained throughout all the scanning procedures even in the case where the lane is curved or bent. Thus, the relationships of location and density on the digital data in the direction of the lane within the belt area A are detected.

Figure 2:
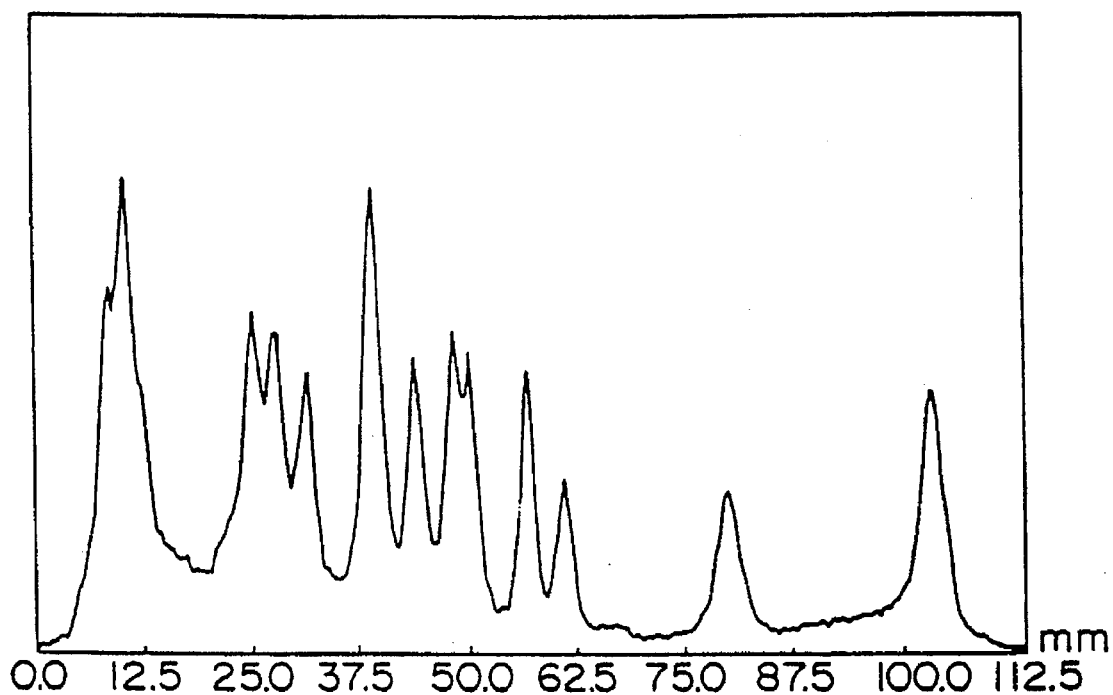
FIG. 2 shows a graph indicating the relationship between location and density of the resolved bands in the electrophoretically formed lane which is designated in FIG. 1 with a rectangle.

The detected relationships are then processed to prepare one dimensional data showing location and density of a series of the bands in the direction of lane. In practice, it is convenient to illustrate the prepared one dimensional data visually in a graph such as that given in FIG. 2. In FIG. 2, all bands (i.e., resolved bands) in the belt area A of FIG. 1 are graphically illustrated to indicate their locations and densities. Apparently, the graph facilitates observation of the relationship of the location and density of each resolved band.

Finally, the location and density of the aimed bands are determined from the one dimensional data preferably illustrated graphically as is shown in FIG. 2. The determination of these data can easily be performed by processing the data in a computer.

In the above description, the procedure for processing the data of one lane is explained. Similar procedures can likewise be employed for processing data of other lanes.

By the use of the sampling method according to the invention, the detection of DNA, RNA, proteins, their fragments and their modified polymers which have been developed and resolved on a supporting medium by gel electrophoresis or thin layer chromatography as well as detection of their densities can be made accurately using a computer with no necessity of high skill. Particularly, since the data processing is required only on the digital data within the belt area, the data processing can be performed in a shorter period of time. Such a shortened data time period is very advantageous in practice, if the autoradiography is performed utilizing a radiation image storage panel. The sampling method of the invention can be favorably employed in combination with various blotting methods such as Southern blotting method.

We claim:

1. A method for determining location and density of bands of biopolymers which are formed by developing and resolving a mixture of biopolymers on a supporting medium in one direction to form a lane of plural bands which comprises the steps:

inputting an image of the lane in a computer in the form of digital data comprising information of location and density;

displaying the image in a display of the computer from the digital data;

setting a belt area along the lane which encompasses the aimed bands of biopolymer;

scanning the belt area a plurality of times in directions crossing the lane with sufficiently small spacing so as to scan every band present within the belt area, said scanning being performed on the digital data and said directions being in parallel with each other, to detect relationships of location and density on the digital data in the direction of the lane within the belt area;

preparing one dimensional data showing location and density of a series of the bands in the direction of the lane; and determining location and density of the aimed bands from the one dimensional data.

2. The method of claim 1, wherein the belt area is set in the form of a parallelogram.

3. The method of claim 1, wherein the scanning is performed in the direction perpendicular to the direction of the belt area.

4. The method of claim 1, wherein the belt area is prepared in the form of a series of parallelograms when the lane is not straight.

5. The method of claim 1, wherein the belt area is prepared by connecting a series of the bands at their centers to form a line and then widening the line on both sides thereof.

6. The method of claim 1, where the belt area is prepared by connecting in sequence a series of the bands at their centers to form a polygonal line when the lane is not straight and then widening the line on both sides thereof.

* * * * *